United States Patent Office.

FRANZ THOMAS, OF AIX-LA-CHAPELLE, GERMANY.

METHOD OF MAKING ALKALOID-CASEIN COMPOUNDS.

SPECIFICATION forming part of Letters Patent No. 626,110, dated May 30, 1899.

Application filed October 6, 1898. Serial No. 692,823. (No specimens.)

*To all whom it may concern:*

Be it known that I, FRANZ THOMAS, a citizen of Germany, residing at Aix-la-Chapelle, in the Empire of Germany, have invented a certain new and useful Manufacture of Compounds of Casein with Alkaloids, of which the following is a specification.

It is known that complex bases, such as quinine, take effect in the organism comparatively slowly and are frequently liable to disagree with invalids. On this account it would be a great advantage to be able to exhibit the alkaloids as medicaments in the form of proteid compounds, such as are the most important constituents of food. The alkaloids can be combined easily with the proteid of milk casein when this is in a moist active condition, the compound or compounds produced being of constant composition. Thus by merely triturating the base with freshly-precipitated moist casein a distinct undoubted reaction is induced. In the case of morphine the product is soluble in water, whereas the products obtained from casein and quinine—cinchonine, caffeine, and the like—are insoluble in water, but are soluble in alcohol. That these products are chemical compounds is shown by the fact that prolonged extraction of the finely-divided substance with ether, chloroform, or like solvents fails to extract the alkaloid. Alkalies which precipitate the alkaloids from solutions of their salts and alkali salts act differently toward these products.

The insoluble alkaloid-casein compounds can be prepared easily in a soluble form by adding an alkali or an alkali salt to the mixture from which the compound is prepared. The quinine-casein dissolves completely in water when an adequate proportion of common salt is used. By prolonged heating with caustic alkalies the compound is decomposed and the alkaloid crystallizes when the solution is cooled.

The alkaloid-casein compounds are dissolved easily by the dilute acids of the gastric juice.

*Example I.*—One hundred parts, by weight, of casein (calculated as air-dried) are well triturated with a solution of twenty-four parts, by weight, of morphine in warm alcohol and the product is dried at a low temperature. The compound is completely soluble in warm water.

*Example II.*—One hundred parts, by weight, of freshly-precipitated casein (calculated as air-dried) are well triturated with thirty parts, by weight, of quinine trihydrate dissolved in a little alcohol. The mixture is warmed with dilute alcohol until it has become uniform, and is then dried at a low temperature. To obtain a soluble preparation, a small proportion of alkali or alkali salt is added to the mixture of quinine and casein.

*Example III.*—One hundred parts, by weight, of freshly-precipitated casein (calculated as air-dried) are triturated with twenty parts, by weight, of caffeine dissolved in hot alcohol or water and dried at a low temperature. By addition of an alkali salt the compound can be rendered soluble. Like all caffeine salts, it is much less stable than are the corresponding quinine compounds.

Having thus described the nature of this invention and the best means I know for carrying the same into practical effect, I claim—

1. The method or process herein described of manufacturing alkaloid-casein compounds, which consists in causing the alkaloid in solution to react with casein, substantially as set forth.

2. The method or process herein described of manufacturing alkaloid-casein compounds, which consists in dissolving the casein with the alkaloid in the presence of a solvent and causing the alkaloid to react with the casein, substantially as set forth.

3. The method or process herein described of manufacturing compounds of casein with alkaloids, which consists in causing the alkaloid in solution to react with casein in the presence of an alkali, substantially as described.

In testimony whereof I have hereunto set my hand in presence of two subscribing witnesses.

FRANZ THOMAS.

Witnesses:
CLARA E. BRUNDAGE,
F. T. STEPHAN.